US012526580B2

(12) United States Patent
Gerkinsmeyer

(10) Patent No.: US 12,526,580 B2
(45) Date of Patent: Jan. 13, 2026

(54) ELECTRODYNAMIC TRANSDUCER FOR VEHICLE INTEGRATION

(71) Applicant: Norman Gerkinsmeyer, Neu-Ulm (DE)

(72) Inventor: Norman Gerkinsmeyer, Neu-Ulm (DE)

( * ) Notice: Subject to any disclaimer, the term of this patent is extended or adjusted under 35 U.S.C. 154(b) by 157 days.

(21) Appl. No.: 18/225,088

(22) Filed: Jul. 21, 2023

(65) Prior Publication Data

US 2024/0040321 A1 Feb. 1, 2024

(30) Foreign Application Priority Data

Jul. 27, 2022 (DE) ......................... 102022118813.2

(51) Int. Cl.

*H04R 9/06* (2006.01)
*H04R 7/02* (2006.01)
*H04R 7/26* (2006.01)
*H04R 9/04* (2006.01)

(52) U.S. Cl.

CPC ................. *H04R 9/06* (2013.01); *H04R 7/02* (2013.01); *H04R 7/26* (2013.01); *H04R 9/045* (2013.01); *H04R 9/046* (2013.01); *H04R 2400/07* (2013.01); *H04R 2400/11* (2013.01)

(58) Field of Classification Search

CPC .......... H04R 9/06; H04R 9/045; H04R 9/046; H04R 9/00; H04R 7/02; H04R 7/26; H04R 7/16; H04R 7/20; H04R 2400/07; H04R 2400/11; H04R 29/00; H04R 2209/00; H04R 2209/041

USPC ......................................... 381/396, 400, 405

See application file for complete search history.

(56) References Cited

U.S. PATENT DOCUMENTS

| | | | | |
|---|---|---|---|---|
| 8,582,799 | B2 * | 11/2013 | Tanabe | H04R 9/025 381/396 |
| 9,883,290 | B2 * | 1/2018 | Timothy | H04R 9/045 |
| 2003/0123692 | A1 * | 7/2003 | Ueki | H04R 1/44 381/396 |
| 2007/0009133 | A1 | 1/2007 | Gerkinsmeyer | 381/398 |
| 2015/0117698 | A1 | 4/2015 | Bullimore | H04R 7/16 |
| 2020/0077199 | A1 * | 3/2020 | Wilk | H04R 9/04 |
| 2022/0394389 | A1 | 12/2022 | Gerkinsmeyer | H04R 9/027 |

(Continued)

FOREIGN PATENT DOCUMENTS

| | | | |
|---|---|---|---|
| DE | 1912059 | 9/1970 | |
| DE | 3123098 | 1/1983 | H04R 7/06 |
| DE | 102014115443 | 4/2015 | H04R 9/04 |

(Continued)

OTHER PUBLICATIONS

Search Report issued in German Patent Appln. Serial No. 10 2022 118 813.2, dated May 23, 2023, with machine English translation, 19 pages.

*Primary Examiner* — Ahmad F. Matar
*Assistant Examiner* — Sabrina Diaz
(74) *Attorney, Agent, or Firm* — HAYES SOLOWAY P.C.

(57) ABSTRACT

An electrodynamic sound transducer having a transducer basket, a flexible membrane and a magnetic system having an air gap, a voice coil on a cylindrical coil carrier and a dampening central element, which is connected to the membrane, includes a coil carrier of the voice coil is connected to the membrane by a mounting adapter. The membrane is configured as a three-dimensional free-form surface except for conical shapes.

27 Claims, 5 Drawing Sheets

(56) References Cited

U.S. PATENT DOCUMENTS

| | | | | |
|---|---|---|---|---|
| 2023/0217182 | A1* | 7/2023 | Yonglei | H04R 9/06 381/412 |

FOREIGN PATENT DOCUMENTS

| | | | |
|---|---|---|---|
| DE | 102020001041 | 8/2021 | H04R 5/02 |
| WO | 2004068898 | 8/2004 | H04R 7/12 |
| WO | 2021164804 | 8/2021 | H04R 1/02 |

* cited by examiner

ELECTRODYNAMIC TRANSDUCER FOR VEHICLE INTEGRATION

BACKGROUND OF THE INVENTION

The invention relates to an electrodynamic sound transducer having a transducer basket having at least one air passage, a flexible membrane for generating sound, a magnetic system having magnets, a magnetic back-iron, a pole plate, and an air gap between the pole plate and the magnets, and a voice coil on a substantially cylindrical coil carrier, wherein the latter at one end dips into the air gap and at the other end is connected to the membrane.

A similar sound transducer is already known from documents PCT/DE2021/000031 and DE 10 2020 001 041.5 of the inventor, which can be integrated in an inconspicuous and space-saving fashion in an interior paneling of a vehicle, the surface of the interior paneling usually becoming part of the membrane of the sound transducer. However, it has been discovered that the configuration described there was not yet fully able to achieve the desired sound quality.

Therefore, the problem addressed by the invention is to significantly improve the known type of an integrated sound transducer merging with the interior paneling of a vehicle in regard to its audio quality.

This problem is solved by the features of the independent patent claims. Advantageous refinements of the invention are the subject matter of dependent claims.

The inventor has discovered the following:

Particularly in the automotive and aviation industry, the integration of the existing sound transducers in the remaining surfaces of the paneling in the doors, sides, ceilings and instrument panels is a very major problem, since these are usually relatively deep and heavy in design and can in particular optically disturb the design.

Due to the necessity for acoustic signals and communication in the vehicles and for reasons of audio quality, however, the installation of sound transducers cannot be avoided. Thus, for example in the automotive industry, tweeters are usually accommodated in the mirror triangles, A-columns, or lying in the corners of the instrument panels and in the rear in the C or D-columns or in paneling.

The situation is even more difficult in the case of the lower and larger-diameter midranges and basses. Here, an adequate design space must be provided for all loudspeakers for the wiring, a back-side cover, adapters, protective grilles, and many amplifier channels in order to transmit appropriate power.

What is more, increasingly more electronics, storage batteries, safety features such as reinforcements or airbags are present especially in the new hybrid and E-vehicles, in the doors or in the instrument panels, in the rear shelves or the A, B, C and D-columns or the spars. Therefore, a reduced design space requirement, efficiency, and weight saving are becoming increasingly important.

As already described in document PCT/DE2021/000031, the type of the integrated sound transducer has a basket integrated in a support structure of a vehicle component, and a membrane which utilizes the surface of the vehicle component to generate sound, neither a bead nor a centering being present. In other words, the sound transducer merges with the respective vehicle component, for example with the support structure of a paneling.

As compared to the sound transducer presented in document PCT/DE2021/000031, the inventor has discovered that the following elements and components are to be fundamentally altered in order to achieve the goal of an improved rendering, where individual changes do not necessarily lead to success, but rather the success will emerge only from the interplay of multiple changes. Basically, these elements are:

- the ring-shaped voice coils with the likewise ring-shaped coil carrier and its placement on the membrane;
- the central element, having a connection to the membrane;
- the fastening of the membrane to the basket;
- the membrane, especially its structure and configuration.

SUMMARY OF THE INVENTION

According to the invention, the coil carrier of the voice coil is now no longer connected directly to the membrane, but instead across a mounting adapter, wherein the mounting adapter at the voice coil side is complementary in shape to the coil carrier of the voice coil and at the membrane side is complementary in shape to the free-form surface of the membrane, wherein preferably the basic shape of the contours of the voice coil and the mounting adapter—seen from the front or from the rear—is also different in configuration. The membrane can be configured as a free-form surface extending in three dimensions. Furthermore, the mounting adapter should be configured without steps and edges between the coil carrier of the voice coil and the membrane. Moreover, the pole plate of the magnetic system should be connected centrally and directly through a central element to the free-form surface of the membrane. Furthermore, the membrane should stand in communication with the transducer basket across an elastic damper layer. A flexible sandwich connection to an interior foam layer is produced here through an encircling portion of the membrane and an encircling portion of the transducer basket.

Thanks to the improvements according to the invention in the sound transducer, basically the following problems for sound transducers of this type in the prior art are improved in regard to standing and reflected modes, surface resonances, and distortion susceptibility of the membrane.

On the basis of the statements made above, the inventor is proposing the improvement in an electrodynamic sound transducer known per se, wherein the known sound transducer comprises:

- a transducer basket having at least one air passage,
- a flexible membrane,
- a magnetic system having a magnet, a magnetic back-iron, a pole plate, and an air gap between the pole plate and the magnet,
- a voice coil on a substantially cylindrical coil carrier, which dips into the air gap and which is connected to the membrane for generating sound, and
- a damping central element, which is connected to the membrane.

The improvement according to the invention consists in:

- the coil carrier of the voice coil is connected to the membrane by a mounting adapter,
- the membrane is configured as a three-dimensional free-form surface except for conical shapes,
- the mounting adapter at the voice coil side is complementary in shape to the coil carrier of the voice coil and at the membrane side is complementary in shape to the free-form surface of the membrane,
- the mounting adapter is configured without steps between the coil carrier of the voice coil and the membrane,
- the pole plate of the magnetic system is connected centrally and directly through the central element to the free-form surface of the membrane, and a damper layer is arranged in the marginal region between the membrane and the transducer basket.

It is explicitly pointed out that the invention does not relate to sound transducers having a membrane with conical shaping. However, if sound transducers having a membrane in some other rotationally symmetrical shaping are known on the contrary from the prior art, these are also considered as not belonging to the invention.

Given the configuration of the membrane, it is advantageous for the membrane to have different thicknesses in the surface. In this way, partial surfaces with less shape stability can be reinforced, so that the formation of unwanted oscillation modes is prevented.

In particular, the membrane can be thinner in regions of greater curvature and thicker in regions with smaller curvature.

Furthermore, it is especially advantageous for the membrane to be thicker in regions of the connection to force-transmitting components than in free regions without force transmission. In this way, the force-introducing regions of the membrane are reinforced, these being in particular the regions with the mounting adapter and/or the central element and/or regions of the sandwich-like connection to the basket across a foam layer, in order to also prevent here the formation of unwanted spurious oscillations.

Furthermore, the transducer basket can comprise an encircling shoulder, at which the membrane is connected to the transducer basket via the foam layer. The shoulder thus functions as a connection surface of the transducer basket to the membrane with the elastic foam layer arranged in between.

Likewise, the transducer basket can comprise at least one encircling groove, which prevents resonances and modes from moving further outwardly and then being reflected.

It has furthermore been discovered that it is especially advantageous for the central element to be formed single-piece, since oscillation reflections may occur at the boundary surfaces of multipiece elements.

Advantageously, the membrane of the sound transducer can be formed single-piece and/or sandwich-like.

Furthermore, the membrane can have at least one convex and at least one concave region, wherein these regions pass smoothly into one another, i.e., only gentle transitions are present, and no shoulders and edges, in order to avoid oscillation reflections.

It is especially advantageous that the possibility exists in this sound transducer to make the membrane coated with a laminating material. In this way, the sound transducer can be coated with the customary laminating materials in automotive technology in the interior and thus becomes practically “invisible” in the sense that it is unrecognizable from the passenger compartment, i.e., blends into the surfaces.

Furthermore, in one particular configuration, the membrane can have a thickness gradient which is thicker at the central fastening region and becomes thinner toward the outside at least at first.

The membrane can also have a thickness gradient which is thicker at the fastening region of the mounting adapter and becomes thinner toward the central fastening region.

Likewise, the membrane can advantageously have a thickness gradient which is thicker at the fastening region of the mounting adapter and becomes thinner toward the encircling shoulder.

Thanks to the sound transducer being integrated in a vehicle, the membrane can also extend beyond the encircling shoulder and the foam layer.

Furthermore, the membrane can have a thickness gradient which increases at least initially in the region going beyond the foam layer.

Advantageously, the membrane should have a thickness gradient which is free of shoulders and only has very gradual thickness changes.

It is also especially advantageous in order to avoid unwanted modes for the outer and/or inner contour of the encircling shoulder and the outer and/or inner contour of the mounting adapter of the coil carrier of the voice coil—each time looking in a top view onto the sound transducer, i.e., in a view from the front or from the rear—to be significantly different in regard to their basic shape. As a rule, the voice coil will have a round contour shape, so that the contour of the mounting adapter should accordingly be non-round. For example, the contour of the mounting adapter can then be rectangular or square with preferably rounded corners. Advantageously, however, both contours should have at least approximately to one another one congruent center of gravity or one congruent center so that no unwanted torques are produced on the voice coil.

In accordance with the above-described feature, it is also proposed that, if an encircling groove is present, the outer and/or inner contour of the encircling groove of the transducer basket and the encircling outer and/or inner contour of the mounting adapter of the coil carrier of the voice coil—each time looking in a top view onto the sound transducer—are significantly different in regard to their basic shape.

Furthermore, it is proposed accordingly that, if an encircling shoulder is present on the transducer basket, the outer and/or inner contour of the shoulder of the transducer basket and the outer and/or inner contour of the mounting adapter in the region of the connection to the coil carrier and/or in the region of the connection to the membrane—each time looking in a top view onto the sound transducer—are significantly different in regard to their basic shape.

Regarding the configuration of the magnetic system, it is advantageous for a ring-shaped copper cap to be arranged on the central region of the magnet.

Also advantageously the transducer basket of the sound transducer can be configured as part of a support structure of a land, air, or water vehicle, wherein the membrane is integrated seamlessly in the interior paneling of the vehicle.

Moreover, the transducer basket can be part of a support structure of a land, air, or water vehicle, wherein the membrane is laminated seamlessly with the lamination of the interior paneling of the vehicle.

Preferably, the sound transducer can be configured such that it is free of a bead on the membrane and/or free of a centering for the membrane.

Moreover, especially preferably the sound transducer can be configured such that the voice coil comprises two separate windings in the same air gap. The windings can be electrically hooked up in series or in parallel, wherein they are contacted via a single common amplifier channel or in each case via their own amplifier channel.

Finally, the sound transducer can also be configured such that the transducer basket is already configured as part of a support structure of a vehicle, i.e., the basket is already configured during the fabrication of the support structure.

Furthermore, it is pointed out that, in a special configuration in the context of the invention, the sound transducer can also be configured such that the membrane has the same thickness throughout and/or its free-form surface has no deformation of any kind, i.e., is straight and flat, and/or the membrane has no surface lamination.

BRIEF DESCRIPTION OF DRAWINGS

In the following, the invention is described more closely on the basis of preferred exemplary embodiments with the aid of the figures, where substantially only the features necessary to understand the invention are represented. There are shown, specifically.

DETAILED DESCRIPTION OF INVENTION

Figure 1:
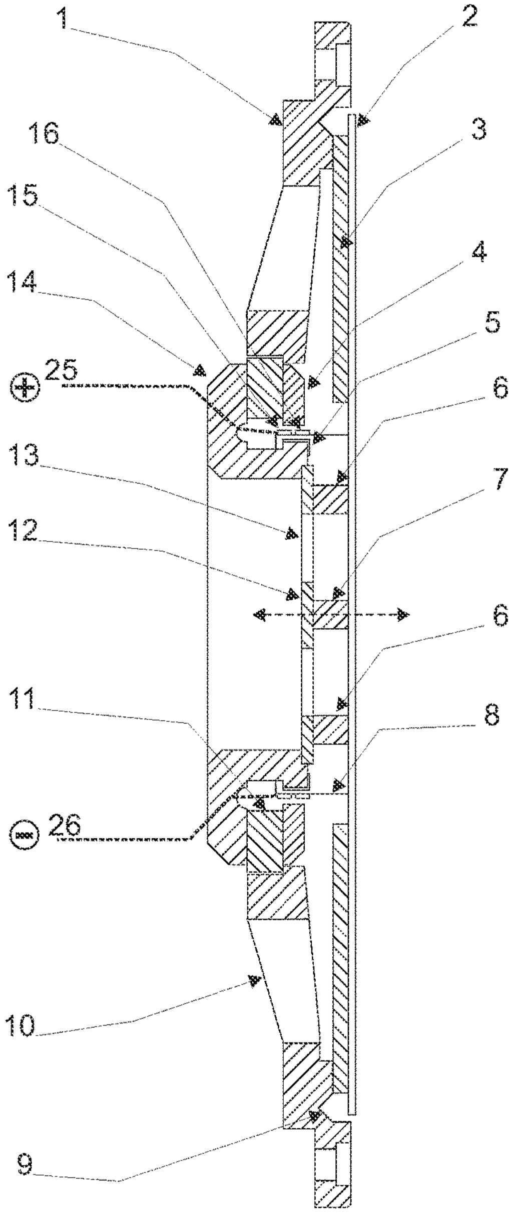
FIG 1 Prior Art
FIG. 1: First variant of an integrated sound transducer according to the prior art of PCT/DE2021/000031 in a vertical cross-sectional representation—section A-A of FIG. 8.

FIG. 1 shows the basis of the integrated sound transducer according to document PCT/DE2021/000031 as a flat support construction with a transducer basket 1, having webs and air passages 10, the number of which should correspond as much as possible to a prime number. Mounted in this transducer basket 1 is the magnetic system, consisting of at least one magnetic back-iron 14, a magnet 11, a pole plate 4 and a pole core, formed by the back-iron 14, which can have a surrounding copper or pole cap 5.

The voice coil dips into the air gap of the magnetic system, which is formed by the pole plate 4 and the copper cap 5. The voice coil consists of the coil carrier 8 and the two separate windings 14 and 16 with their electrical contacting points 25 and 26. The voice coil carrier is fastened on the underside of the support membrane 24. At the center of the magnetic system is situated an elastic central guide damper 12 with its webs and air passages 13, the number of which should likewise correspond to a prime number. At its center, the central guide damper 12 is connected across an elastic central damper 7 to the underside of the membrane 2.

Figure 2:
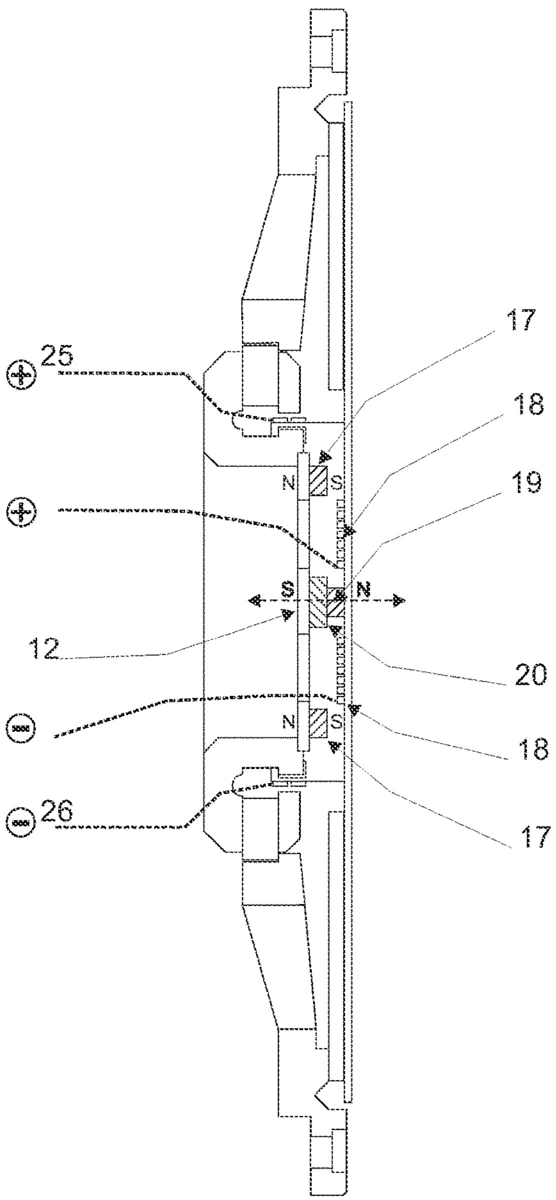
FIG 2 Prior Art
FIG. 2: second variant of an integrated sound transducer according to the prior art of PCT/DE2021/000031 in a vertical cross-sectional representation—section A-A of FIG. 8.

FIG. 2 shows the integrated sound transducer from PCT/2021/000031 in a hybrid version with the central guide damper 12, which comprises further magnets in the direction of the membrane 2, namely an encircling magnet 17 and at the center a central magnet 20. In the region inside the coil carrier 8, on the underside 10 of the membrane 2, there is attached a spiral conductor track 18, which is also electrically contacted in the same direction at the respective end of the winding. Depending on the application, the contacting can be done jointly with the other contacts 25 and 26, but also separately. The double arrow shows the direction of movement. Furthermore, an elastic and shallower central damper 19 is arranged, being located here between the central magnet and the membrane 2.

Figure 3:
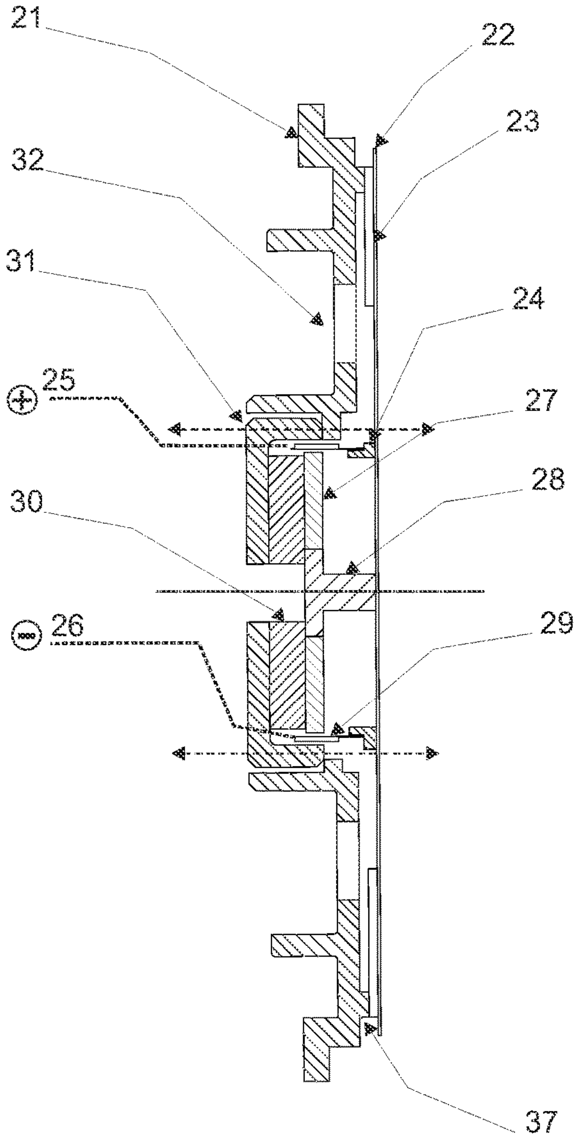
FIG. 3: integrated sound transducer in a vertical cross-sectional representation without lamination of the membrane—section A-A of FIG. 9.
Figure 5:
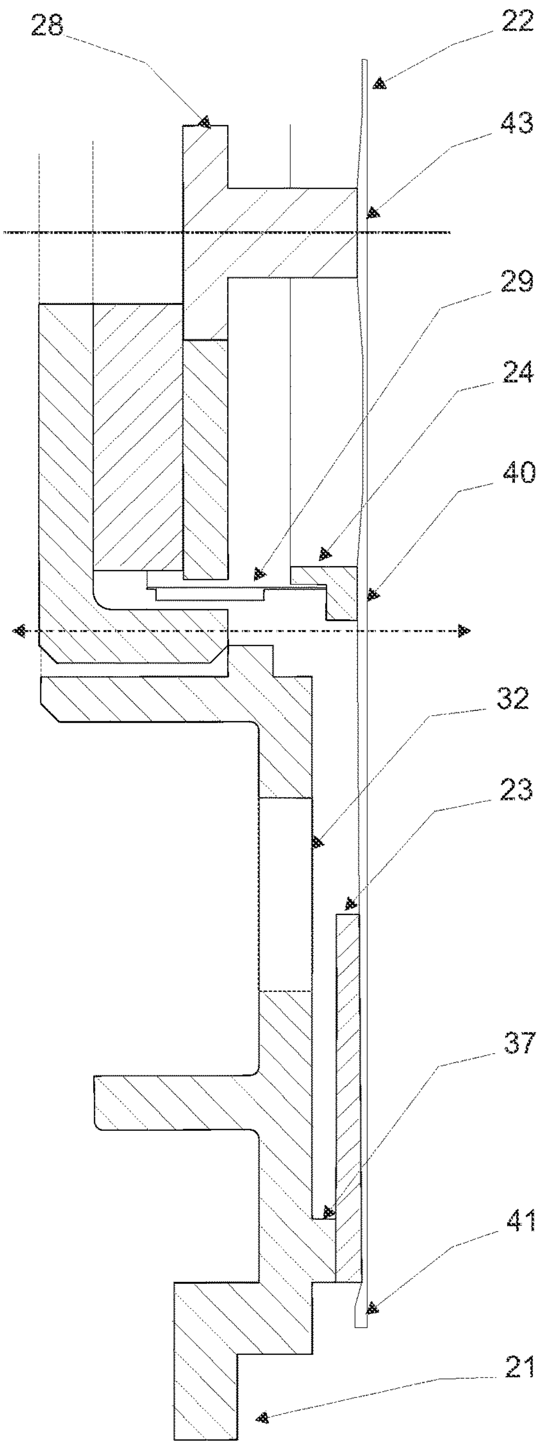
FIG. 5: integrated sound transducer in a detail—and cross-sectional representation without lamination—detail section A-A of FIG. 9.

FIG. 3 shows the sound transducer according to the invention in the cross section and FIG. 5 shows a detail cutout of FIG. 3 from the region of the magnetic system.

In this embodiment, the transducer basket 21 is configured such that it is set back so far that it can be mounted with the support structure, the paneling and the lamination of a vehicle virtually flush with the baffle and thus transmits the sound directly. The two broken lines and double arrows indicate the direction of movement of the voice coil and the membrane.

By contrast with the previously known configurations of FIGS. 1 and 2, the kinetic energy of the voice coil 22 is not introduced directly into the membrane, but instead through the mounting adapter 24.

The mounting adapter 24 thanks to a configuration which accordingly is complementary in shape to the membrane in the fastening region, offers an increased fastening surface, as compared to a direct mounting of a coil carrier, on the underside of the membrane 22 and therefore transmits the kinetic energy in a better way. On the other hand, when the surface of the membrane 22 is touched or pressed in, this prevents the much less stable voice coil 29 with the coils 15, 16 and their coil carrier 8 from being able to be deformed or moved off center such that they are dragged in the air gap of the magnetic system or become jammed so that the sound transducer can no longer be used.

This danger of jamming exists because the air gap of the magnetic system, which is formed by the pot-shaped magnetic back-iron 31, the magnet 30 and the pole plate 27, is also only a few tenths of a millimeter larger than the voice coil 29 around its periphery.

A further way of preventing a disruption due to touching, pressing, or bumping is to configure the geometry of the transducer basket 21 such that the distance behind the membrane up to the transducer basket 21 is so slight that the region outside of the voice coil 29 with its mounting adapter 24 is only a few tenths larger than the largest possible amplitude of the membrane 22, 39.

A further improvement relates to the multipiece central guide damper 12 or the central damper 7. It has been discovered that it is advantageous to use instead of this a single-piece central element 28. But this should be stronger and less dampening and less movable in its design here. This also ensures that no damage is caused by pressing in or accidentally bumping against the membrane 22. Furthermore, thanks to the use of said single-piece central element 28, a much better ring mode formation is assured, which is also proven acoustically and by measurements, as proven by the measurements shown below.

A further advantageous property of the new sound transducer is the embossing of a contour on the surface of the membrane on one side, preferably on the underside, i.e., the side of the membrane 22 facing the central element 28 and the mounting adapter 24. The height difference of the embossing as compared to the surface remaining smooth is only a few tenths of a millimeter here. The material thickness of the membrane 22 itself is only slightly thicker than the thinnest remaining region here. Thus, in the mounting region of the central element 28 there is a thickening 43, which gently diminishes toward the outside, in order then to again increase gently up to the inner peripheral thickening 40 on the mounting adapter 24.

Outside the thickening 40 in the mounting region of the mounting adapter 24, the material thickness again becomes gently thinner until just before the encircling periphery of the membrane 22 and only just before the actual encircling membrane end does the material thickness again increase and thereby forms an impedance termination 41.

For the embossing of the membrane, said membrane originally smooth on both sides is placed in a corresponding heatable mold and deformed by uniform heating and very high pressure. The polymer chain structure is influenced here such that, after cooldown below the softening point, the new shape and structure is assumed and preserved by said structure.

Besides other possible deformation processes, the one described above can also be used for the membrane 39 configured as a 3D free-form surface, as will be described in FIGS. 4 and 6.

This produces the effect that the ring wave propagation can be formed in uninterrupted and low-reflection dampening fashion toward the inside—i.e., between the voice coil 29 with the mounting adapter 24 and the central element 28—and to the outside as far as the margin, depending on the frequency and wavelength, or the amplitude. The now thicker terminating margin 41 acts here like an impedance termination and ensures that short-wave perturbations are reflected back from the margin and disrupt the then arriving modes.

Figure 4:
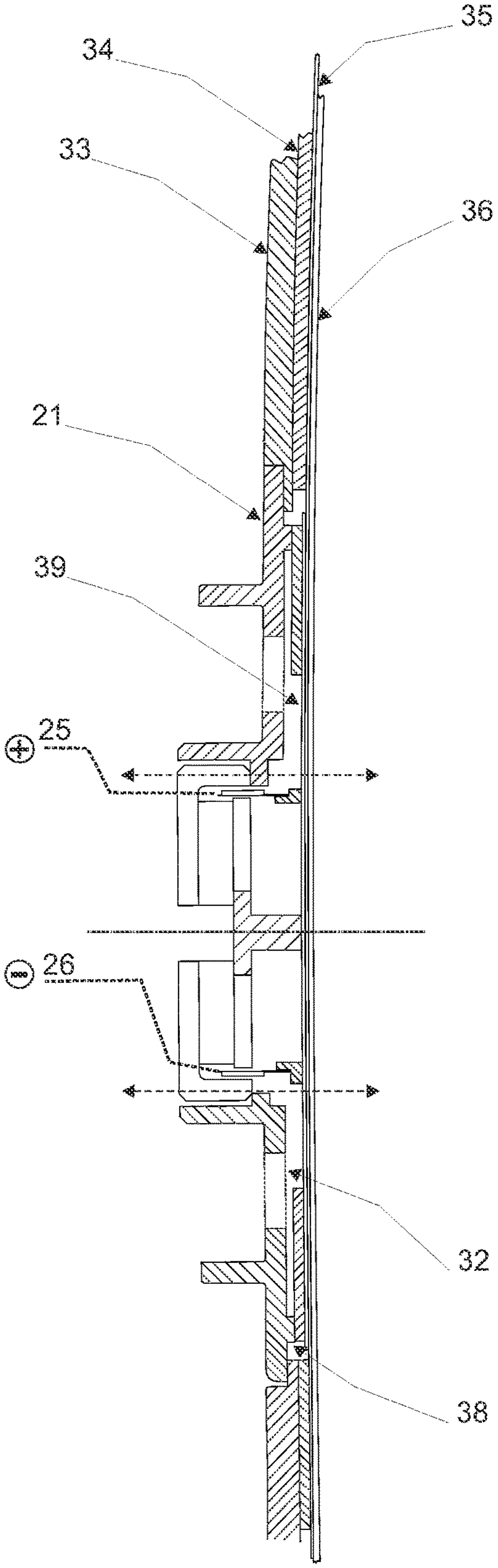
FIG. 4: integrated sound transducer in a vertical cross-sectional representation with a membrane having lamination—section A-A of FIG. 9.
Figure 6:
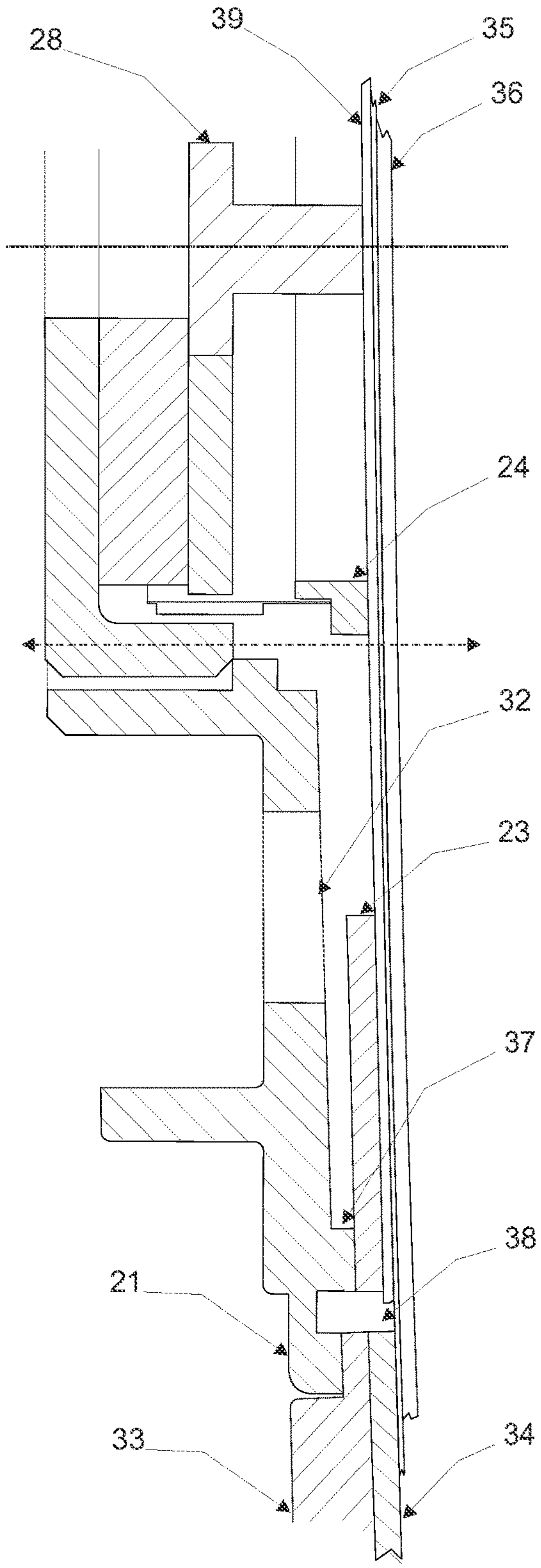
FIG. 6: integrated sound transducer in a detail—and cross-sectional representation with lamination with shape gradient—detail section A-A of FIG. 9.

A highly integrated laminated version of the sound transducer is shown in FIGS. 4 and 6 in a detail representation in the region of the magnetic system. Here, the transducer basket 21 passes structurally into the support structure of the paneling 33 with the foam base 34 and the laminating material 36, wherein the front side of the membrane 39 is attached across a support film 35 indirectly with the underside of the laminating material 36 so that it can produce sound.

The continuously positioned support film 35 prevents the narrow gap formed by the encircling groove 38 and the membrane 39, which is set back in encircling fashion, from emerging in optically long-lasting fashion on the front or outer side of the laminating material 36 coated on top of it. This step is important primarily when using laminated leather, since leather has virtually no surface tension at all and still undergoes change when conditions are humid or dry. But this step can also be advantageous in the case of lamination with other materials and cover layers.

Furthermore, the special shape and surface of this variant should be described. Unlike the embodiments of FIGS. 1 and 2 and the variants described here in FIGS. 3 and 5, this involves a membrane 39 which is formed as a three-dimensional free-form surface. Thus, such a membrane can be incorporated seamlessly in a given architectural setting of paneling or other components. This requirement is required primarily in the automotive industry, but also in other applications, and constitutes a special challenge in implementation.

The mounting adapter 24 and the central element 28 also play a load-bearing role in this version of the sound transducer, whether concave, convex, or flat, whether laminated or unlaminated. The respectively adapted surface and material properties of the two elements ensure that the ring modes are formed in a physically secure manner, that the system functions as a ring mode converter over the entire frequency range, and the construction behind the membrane 39 is neither optically nor haptically evident or becomes perceptible on the respective surface of the membrane 39 and the laminating materials 36. The corresponding protection mechanisms against a disruption, as already described above for FIGS. 3 and 5, can also be used in this version.

Another improved element is the encircling groove 38, arranged outwardly behind the shoulder 37, in the preferably laminated versions. It has been discovered that, whether with a flat, a 3D-deformed, or a membrane of uniform thickness, this membrane 39 should not extend far beyond the encircling shoulder 37. In the case of the laminated membrane version, this membrane 39 should not be mounted directly beyond the encircling groove 38 with other encircling or adjoining components, such as the foam base 34 or a support structure 33 of the paneling.

The reason for this as well is that the reflection of oscillations is to be avoided. The modes or oscillations introduced into the membrane 39 must be formed beyond the membrane end without being reflected. It is important for the membrane margin, which is mounted flexibly on the encircling shoulder 37 of the transducer basket 21 on the back side across the one-sided adhesive damper layer 23, to still be able to move freely.

This is shown in FIG. 6 with the aid of the enlarged representation in the region of the encircling groove 38 after the encircling shoulder 37. Thus, the membrane 39 ends shortly after the encircling shoulder 37, while the support film 35 laminated with the laminating material 36 runs beyond this and only ends on the foam base 34 of the support structure of the paneling 33.

Figure 7:
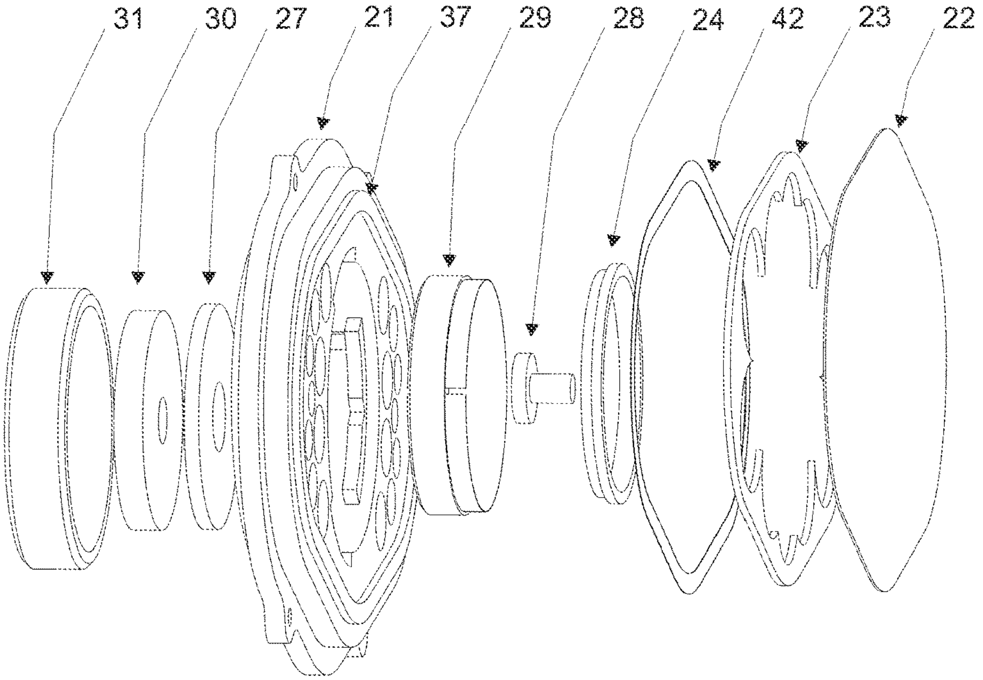
FIG. 7: integrated sound transducer in the 3D exploded representation of a simple integrated version.

FIG. 7 shows an exploded drawing of basically the components making up the sound transducer according to the invention. In addition to the parts already described in the preceding figures and texts, a two-sided transfer adhesive is shown here with the reference number 42, by which the back side of the encircling damper layer 23 is permanently elastically mounted with the encircling shoulder 37 of the transducer basket 21. Other alternative gluing techniques, however, are not ruled out in the context of the invention.

Furthermore, the following parts are shown: the magnetic back-iron 32, the magnet 30, the pole plate 27, the transducer basket 21 with the encircling shoulder 37, the voice coil 29, the central element 28, the mounting adapter 24, the damper layer 23, being adhesive on one side in the direction toward the membrane 22.

Figure 8:
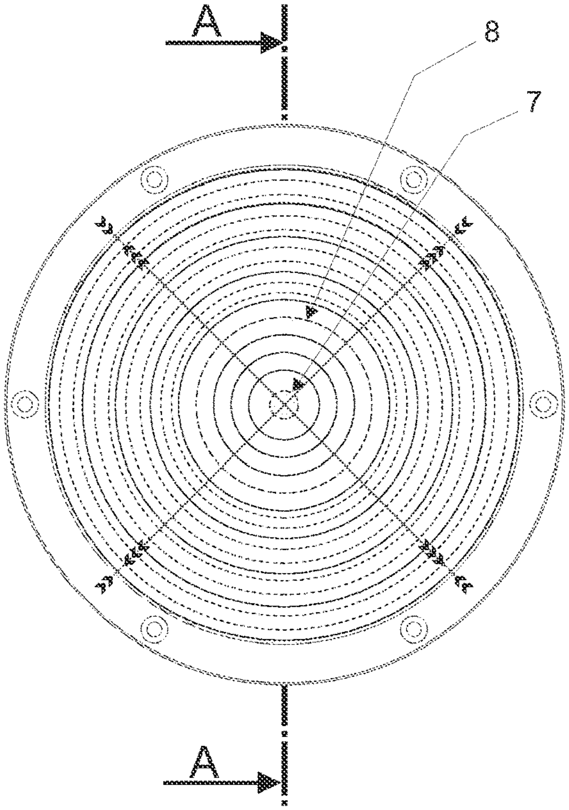
FIG. 8: integrated sound transducer per FIG. 1 in a top view showing the mode propagation and its interferences—prior art.

In FIG. 8, the problems and the formation of the oscillation modes on the membrane by reflecting oscillations are shown in simplified manner with the aid of a top view of a sound transducer in known configuration according to FIG. 1.

As can be seen from FIG. 2, the membrane 2 is mounted with a radial damper 3 via the encircling web with groove 9 with the transducer basket 1. The web with the groove 9 has the same contour in the top view, namely, circular round, as the coil carrier 8 with the voice coils 15 and 16 mounted directly on the membrane 2. This causes problems with the introduced kinetic energy and the reflected oscillations, which are propagated as ring modes in the membrane between the centrally located central damper 7 and the coil carrier 8 and externally surrounding the coil carrier 8 beyond the web with the groove 9 as far as the membrane edge. However, such modes disturb the new oscillations introduced through the voice coil.

These reflections are shown in FIG. 8 by the two double arrow lines with opposite arrows and dashed rings, and the modes with the rings are shown by solid lines.

Figure 9:
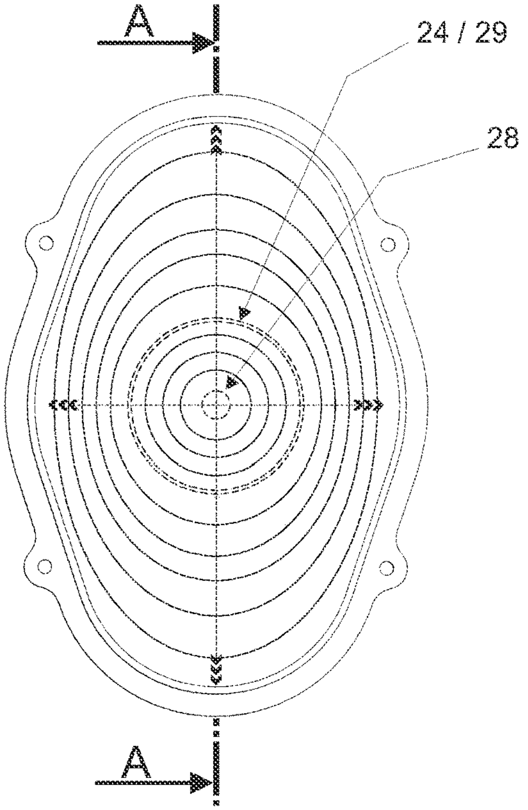
FIG. 9: integrated sound transducer showing the reduced mode propagation thanks to the configuration according to the invention.

One solution approach to this problem is described in FIG. 9, representing a top view of the sound transducer from FIG. 3. The central element 28 can be seen, likewise represented for simplicity by broken lines, situated at the center of the mounting adapter 24 with the voice coil 29 and placed centrally therein. The mode propagation direction of the ring modes is shown by the two double arrow lines and the deforming of the ring modes into oval modes is shown by the circular lines.

By contrast with the embodiments in FIGS. 1, 2, and 8, the transducer basket 21 with its encircling shoulder 37, on which the membrane 22 is mounted across the encircling damper layer 23, has more the shape of an encircling oval. Thus, the contour of the encircling shoulder 37 and the encircling groove 38 differs fundamentally from the contour of the mounting adapter 24. Thus, the two contours cannot be made congruent by simple enlarging or reducing. It has been found that this use of different basic contours prevents the ring modes from being reflected such that they disturb the incoming mode formation in dependence on the wavelength, starting from the circular round mounting adapter 24 in the mounting region and the margin of the membrane 39.

Surprisingly, it has also been discovered that, by using such different basic contours for the mounting adapter 24 in the mounting region for the membrane 39 in relation to the basic contour of the voice coil carrier with the voice coil 29, the configuration of the outer shape of the membrane 39 is almost insignificant, for the same sound quality.

Even if the membrane 39 is likewise circular round in configuration, like the voice coil 29, the negative influences and perturbations are greatly held in check. This is due to the fact that the reflected modes returning from the membrane margin are reflected back toward the outer region of the oval encircling shoulder 37 and die down in the outer region.

In the following FIGS. 11 to 13, the influences of various exemplary embodiments according to the invention are presented by measurements as compared to the prior art in FIG. 10. The measurements themselves were taken in the near field at 30 cm distance, with no smoothing function, in a small housing without a baffle, under the same boundary conditions.

Figure 10:
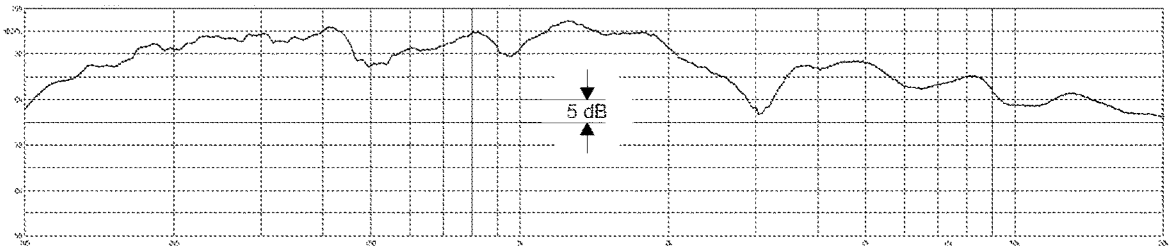
FIG. 10: the frequency response, measured in the near field, of the integrated sound transducer per FIG. 1—prior art.

FIG. 10 shows the typical measured frequency response of a sound transducer in the known configuration according to one of FIGS. 1 and 2. Plotted along the abscissa are the frequencies between 100 Hz and 20 kHz, which are rendered by the sound transducer. Along the ordinate is plotted the sound pressure level in decibels (dB SPL).

In FIG. 10 one can notice distinct drops in the frequency response between 200 Hz and 20 kHz, which are due to the mode reflections and disruptions of the uniform configuration, being circular round in this case.

Figure 11:
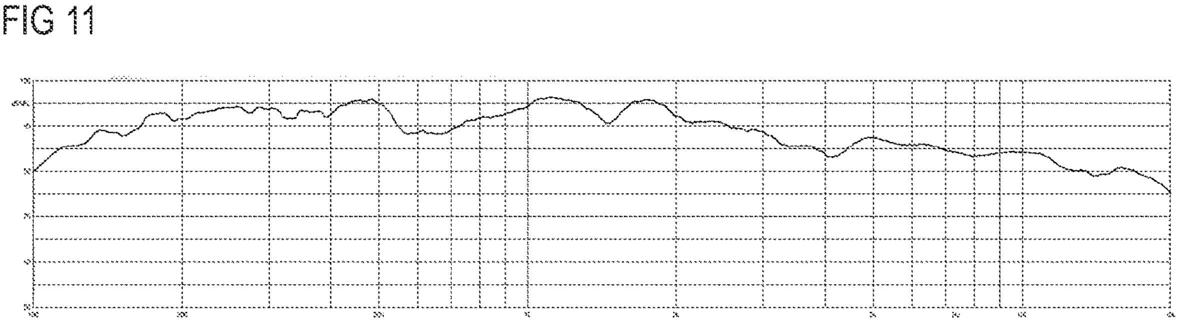
FIG. 11: the frequency response, measured in the near field, of a sound transducer without lamination modified according to the invention.

FIG. 11 shows the measurement of the frequency response of the sound transducer in the embodiment of FIGS. 3 and 5. One notices here a distinct improvement and linearization of the amplitude, especially toward the higher frequencies.

Figure 12:
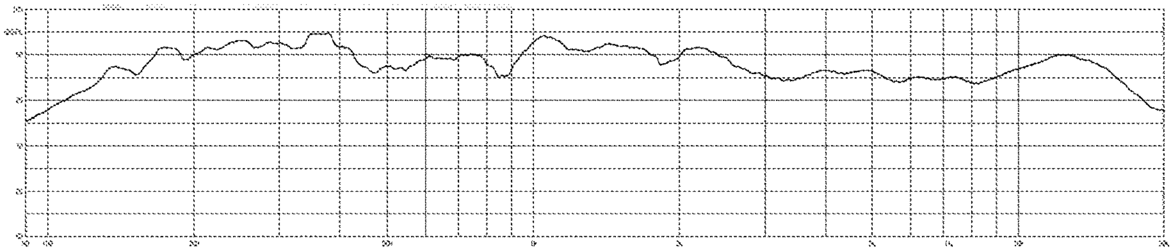
FIG. 12: the frequency response, measured in the near field, of another sound transducer of laminated configuration modified according to the invention.

FIG. 12 shows the frequency response of the sound transducer in an embodiment according to FIGS. 4 and 6. In this version, the membrane 39 laminated with leather 36 and having the same thickness throughout is used, i.e., without the embossed contour. As a result, the frequency response is more smooth and linear as compared to FIG. 11. While the somewhat greater weight of the leather lamination appears in somewhat less sensitivity in the middle tone region between 100 Hz and 2000 Hz, the level increases significantly toward the high frequencies.

Figure 13:
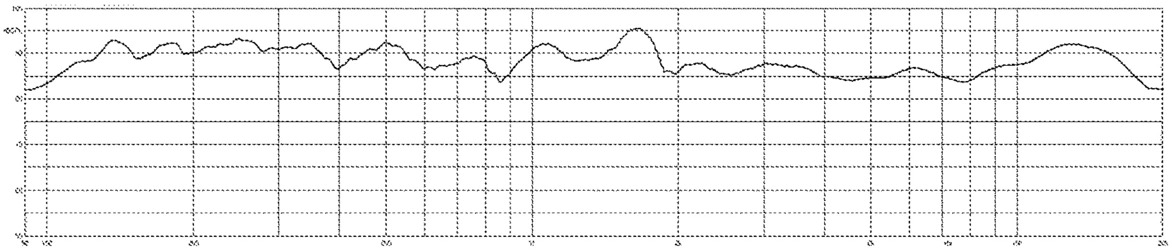
FIG. 13: the frequency response, measured in the near field, of another sound transducer of laminated configuration modified according to the invention.

FIG. 13 shows the frequency response of the sound transducer in an embodiment according to FIGS. 4 and 6, but in this version the membrane 39 laminated with leather 36 has an embossed surface and contour. As a result, the frequency response becomes even more smooth and linear. In particular, the important middle tone region between 100 Hz and 2000 Hz is linearized even more and the level of the lower middle tone region is nearly reached toward the high frequencies.

On the whole, therefore, the invention proposes an electrodynamic sound transducer or loudspeaker in which:

- the coil carrier of the voice coil is connected to the membrane by a mounting adapter,
- the membrane is configured as a three-dimensional free-form surface except for conical shapes,
- the mounting adapter at the voice coil side is complementary in shape to the coil carrier of the voice coil and at the membrane side it is complementary in shape to the free-form surface of the membrane,
- the mounting adapter is configured without steps between the coil carrier of the voice coil and the membrane,
- the pole plate of the magnetic system is connected centrally and directly through the central element to the free-form surface of the membrane,
- and the membrane is connected in two dimensions to the transducer basket across an elastic foam layer.

Although the invention has been described and illustrated more closely in detail by the preferred exemplary embodiment, the invention is not limited by the disclosed examples and other variations can be derived from it by the person skilled in the art, without leaving the protection scope of the invention. In particular, the invention is not limited to the indicated combinations of features, but rather other combinations and partial combinations which can be implemented in a way obvious to the skilled person can also be formed from the disclosed features. Thus, implementations which are not explicitly shown in the figures, yet which emerge from and can be created from the explained embodiments by separate combinations of features, should also be deemed to be encompassed and disclosed by the invention. It also lies within the scope of the invention to produce a mechanical reversal of the functions of the individual mechanical elements of the invention.

List of reference numbers

1 Transducer basket
2 Membrane
3 Radial damper
4 Pole plate
5 Copper cap
6 Encircling damper
7 Central damper
8 Coil carrier
9 Encircling web with groove
10 Air passage
11 Magnet

12 Central guide damper
13 Air passages of the central guide damper
14 Magnetic back-iron
15 1st coil
16 2nd coil
17 Encircling magnet
18 Spiral conductor track
19 Shallower central damper
20 Central magnet
21 Transducer basket
22 Membrane
23 Damper layer
24 Mounting adapter
25 + electrical contacting
26 − electrical contacting
27 Pole plate
28 Central element
29 Voice coil
30 Magnets
31 Magnetic back-iron
32 Air passage
33 Cladding support structure
34 Foam base
35 Support film
36 Laminating material
37 Encircling shoulder
38 Encircling web with groove
39 Membrane
40 Thickness gradient of membrane in the region of the adapter
41 Mechanical impedance termination
42 Transfer adhesive
43 Central fastening region with thickening

The invention claimed is:

1. An electrodynamic sound transducer, having:
a transducer basket having at least one air passage,
a flexible membrane,
a magnetic system having a magnet, a magnetic back-iron, a pole plate, and an air gap between the pole plate and the magnetic back-iron of the magnet,
a voice coil on a substantially cylindrical coil carrier, which dips into the air gap and which is connected to the membrane for generating sound, and
a damping central element, which is connected to the membrane,
wherein
the coil carrier of the voice coil is connected to the membrane by a mounting adapter,
the membrane is configured as a three-dimensional free-form surface except for conical shapes,
the mounting adapter at the voice coil side is complementary in shape to the coil carrier of the voice coil and at the membrane side it is complementary in shape to the free-form surface of the membrane,
the mounting adapter is configured without steps in the area between the coil carrier of the voice coil and the membrane,
the pole plate of the magnetic system is connected centrally and directly through the central element to the free-form surface of the membrane,
and a damper layer is arranged in a marginal region between the membrane and the transducer basket.

2. The sound transducer as claimed in claim 1, wherein the membrane has different thicknesses in the surface.

3. The sound transducer as claimed in claim 2, wherein the membrane is thinner in regions of greater curvature and thicker in regions with less curvature.

4. The sound transducer as claimed in claim 2, wherein the membrane is thicker in regions of connection to force-transmitting components than in free regions with no force transmission.

5. The sound transducer as claimed in claim 1, wherein the transducer basket comprises an encircling shoulder, at which the membrane is connected to the transducer basket via the damper layer.

6. The sound transducer as claimed in claim 1, wherein the transducer basket comprises at least one encircling groove.

7. The sound transducer as claimed in claim 1, wherein the central element is formed single-piece.

8. The sound transducer as claimed in claim 1, wherein the membrane is formed single-piece.

9. The sound transducer as claimed in claim 1, wherein the membrane is formed sandwich-like.

10. The sound transducer as claimed in claim 1, wherein the membrane has at least one convex and at least one concave region and these regions pass smoothly into one another.

11. The sound transducer as claimed in claim 1, wherein the membrane is coated with a laminating material.

12. The sound transducer as claimed in claim 1, wherein the membrane has a thickness gradient which is thicker at a central fastening region and becomes thinner toward the outside at least at first.

13. The sound transducer as claimed in claim 1, wherein the membrane has a thickness gradient which is thicker at a fastening region of the mounting adapter and becomes thinner toward a central fastening region.

14. The sound transducer as claimed in claim 5, wherein the membrane has a thickness gradient which is thicker at a fastening region of the mounting adapter and becomes thinner toward the encircling shoulder.

15. The sound transducer as claimed in claim 5, wherein the membrane extends beyond the encircling shoulder and the damper layer.

16. The sound transducer as claimed in claim 15, wherein the membrane has a thickness gradient which increases at least initially in the region going beyond the damper layer.

17. The sound transducer as claimed in claim 1, wherein the membrane has a thickness gradient which is free of shoulders and only has very gradual thickness changes.

18. The sound transducer as claimed in claim 5, wherein—each time looking in a top view onto the sound transducer—the outer and/or inner contour of the encircling shoulder and the outer and/or inner contour of the mounting adapter of the coil carrier of the voice coil are significantly different in regard to their basic shape.

19. The sound transducer as claimed in claim 6, wherein—each time looking in a top view onto the sound transducer—the outer and/or inner contour of the encircling groove of the transducer basket and the encircling outer and/or inner contour of the mounting adapter of the coil carrier of the voice coil are significantly different in regard to their basic shape.

20. The sound transducer as claimed in claim 5, wherein—each time looking in a top view onto the sound transducer—the outer and/or inner contour of the encircling shoulder of the transducer basket and the outer and/or inner contour of the mounting adapter in the region of the connection to the coil carrier and/or in the region of the connection to the membrane are significantly different in regard to their basic shape.

21. The sound transducer as claimed in claim 1, wherein a ring-shaped copper cap is arranged on a central region of the magnet.

22. The sound transducer as claimed in claim 1, wherein the transducer basket is part of a support structure of a land, air, or water vehicle and the membrane is integrated seamlessly in an interior paneling of the vehicle.

23. The sound transducer as claimed in claim 1, wherein the transducer basket is part of a support structure of a land, air, or water vehicle and the membrane is laminated seamlessly with an interior paneling of the vehicle.

24. The sound transducer as claimed in claim 1, wherein the sound transducer is free of a bead on the membrane.

25. The sound transducer as claimed in claim 1, wherein the sound transducer is free of a centering for the membrane.

26. The sound transducer as claimed in claim 1, wherein the voice coil comprises two separate windings in the same air gap, being electrically contacted in series or in parallel by the same or each by their own amplifier channel.

27. The sound transducer as claimed in claim 1, wherein the transducer basket is designed as part of a support structure of a vehicle.

* * * * *